United States Patent

[11] 3,543,912

[72] Inventors Masami Miya;
 Koichi Fukuda, Tokyo, Japan
[21] Appl. No. 686,880
[22] Filed Nov. 30, 1967
[45] Patented Dec. 1, 1970
[73] Assignee Nepon Kabushiki Kaisha
[32] Priority May 26, 1967, July 6, 1967
[33] Japan
[31] Nos. 42/33106, 42/43925, 42/57813 and 42/57814

[54] MAGNETIC CONVEYOR SYSTEM
 9 Claims, 18 Drawing Figs.
[52] U.S. Cl. ...................................................... 198/38, 198/41
[51] Int. Cl. .................................................... B65g 17/46, B65g 43/08, B65g 47/48
[50] Field of Search ............................................ 198/41, 38; 271/74.1

[56] References Cited
UNITED STATES PATENTS
3,107,001 10/1963 Kotraba .......................... 198/41
3,272,313 9/1966 Sarovich ........................ 198/41

Primary Examiner—Edward A. Sroka
Attorney—Otto John Munz

ABSTRACT: A conveyor system for conveying light objects, such as documents, upwardly and downwardly between different levels, comprising a belt of a nonmagnetic material, a support frame with a magnetically permeable slide face for the belt, drive means, and a separate carrier box with a magnet, the latter being carried along with the belt by virtue of the magnetic attraction between the magnet and the slide face. Particular destinations are preselected by repulsion magnets on the support frame and by a detachable destination selecting magnet on the carrier box. Several belts may operate in tandem.

Patented Dec. 1, 1970

INVENTORS:
Masami Miya   Koichi Fukuda
BY
Otto John Munz
Attorney.

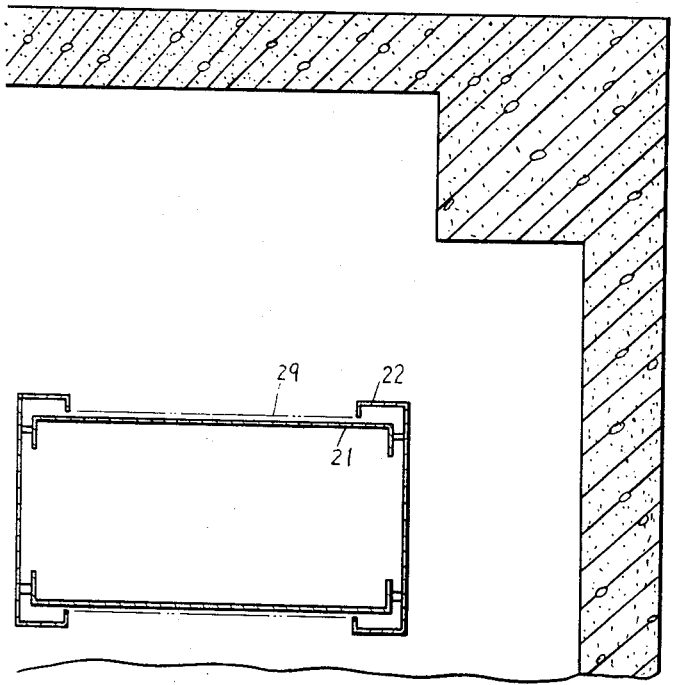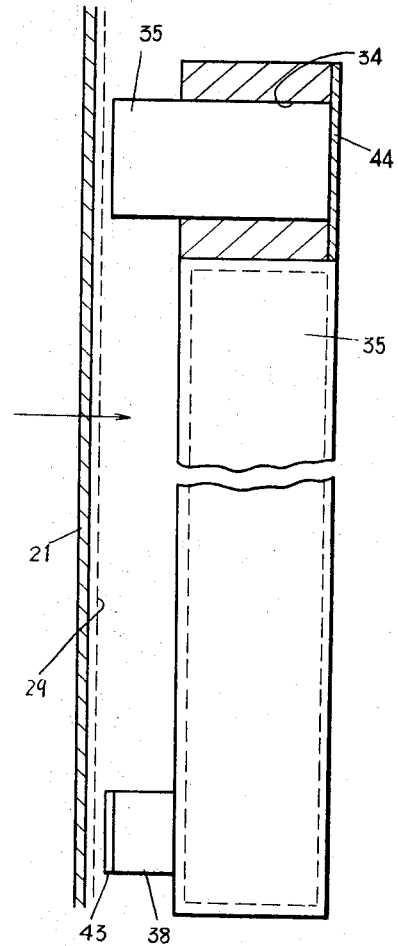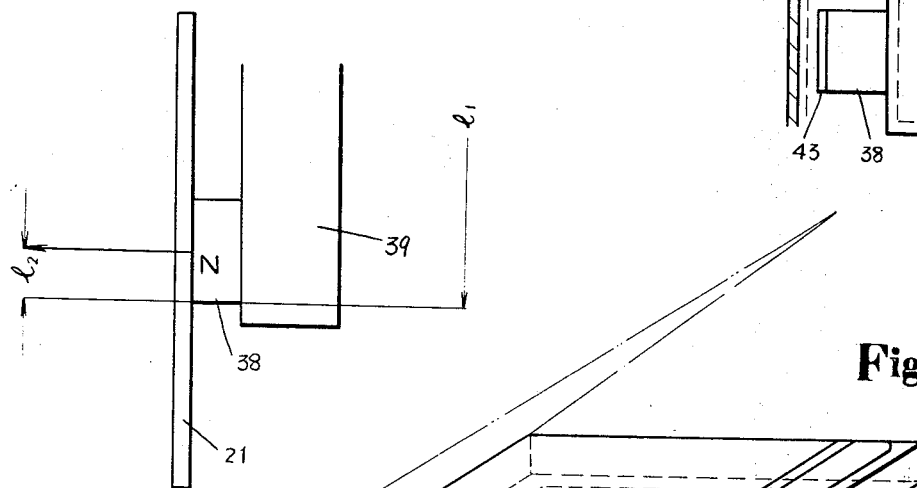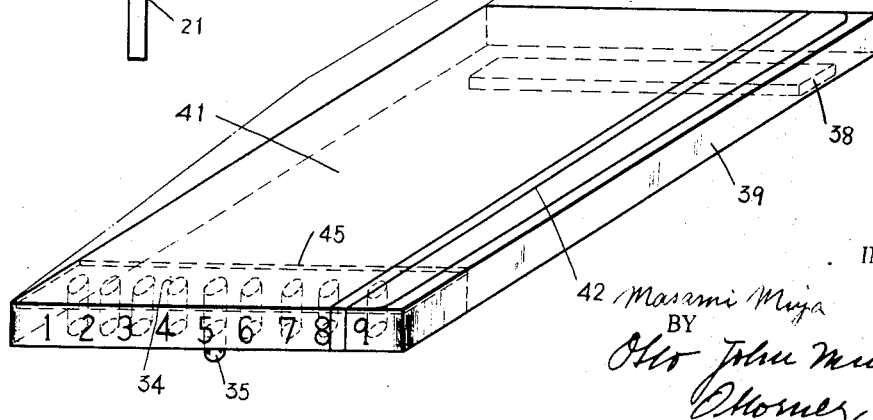

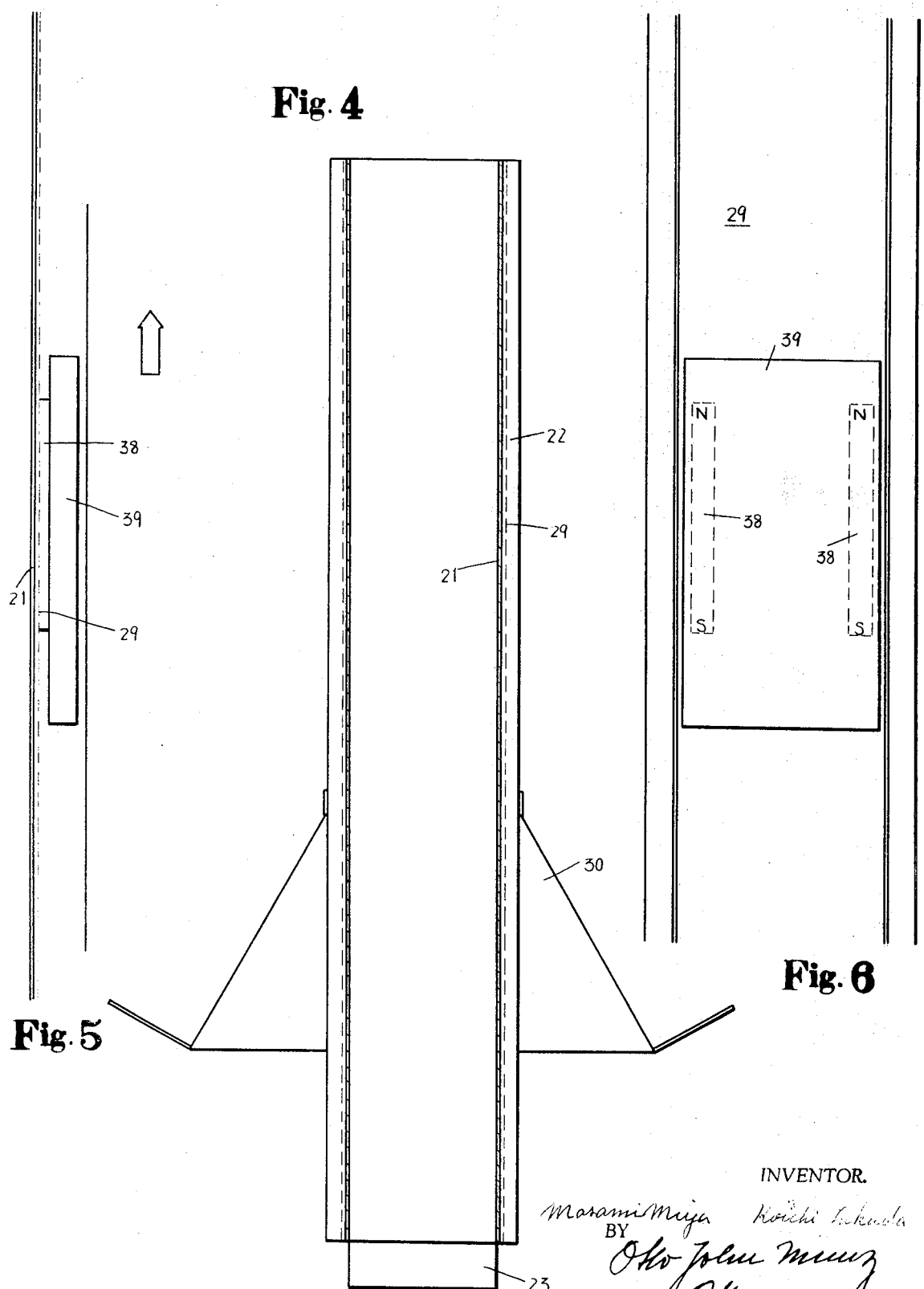

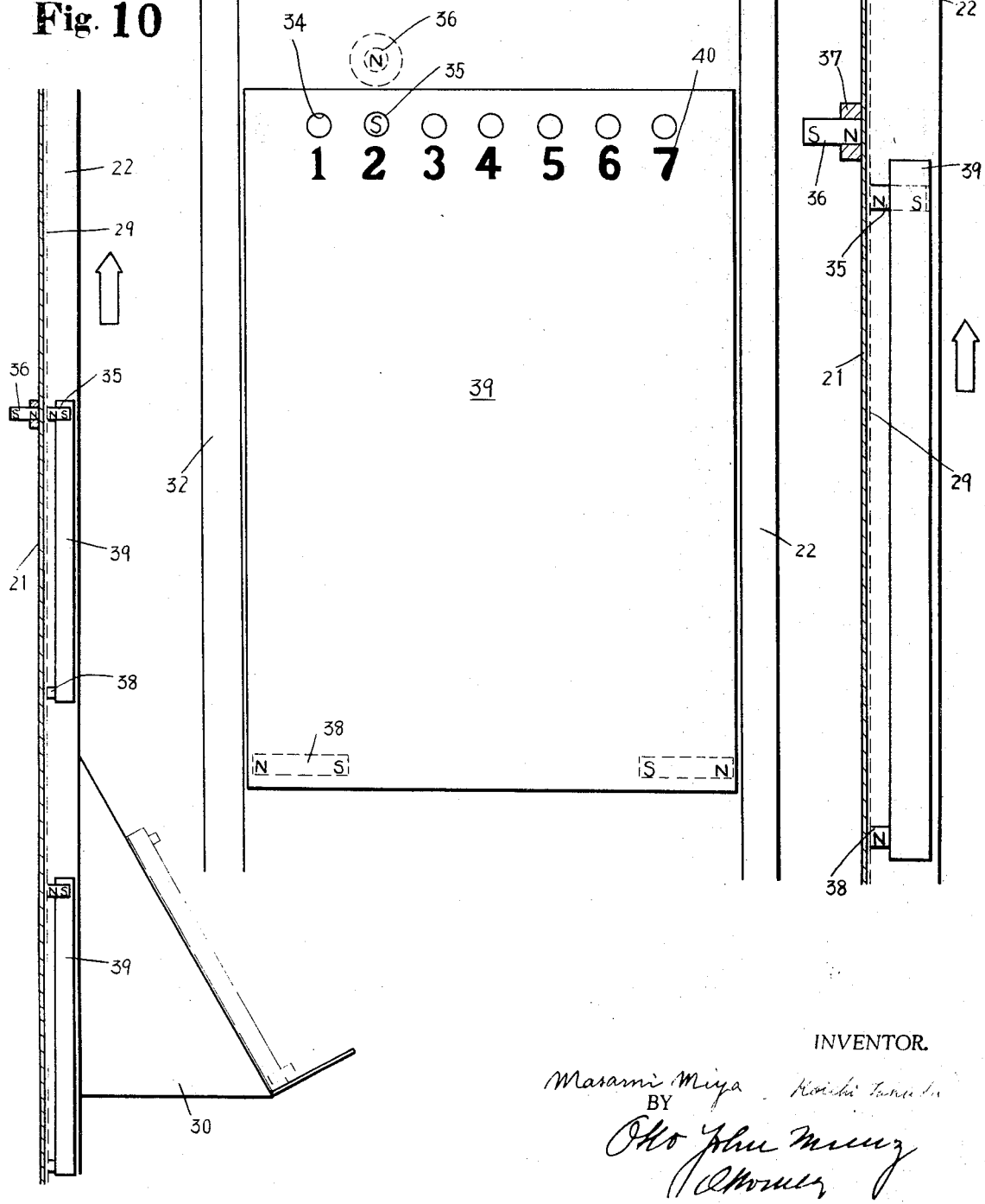

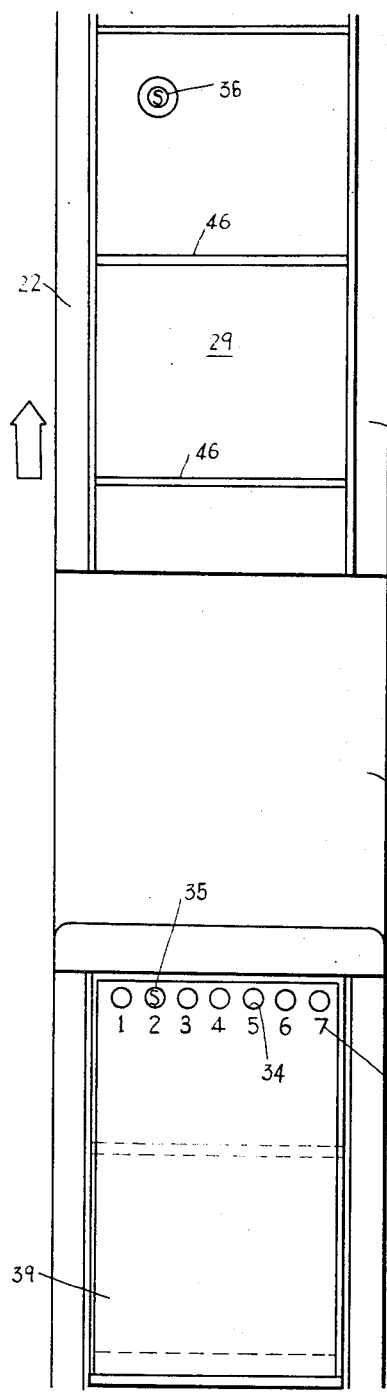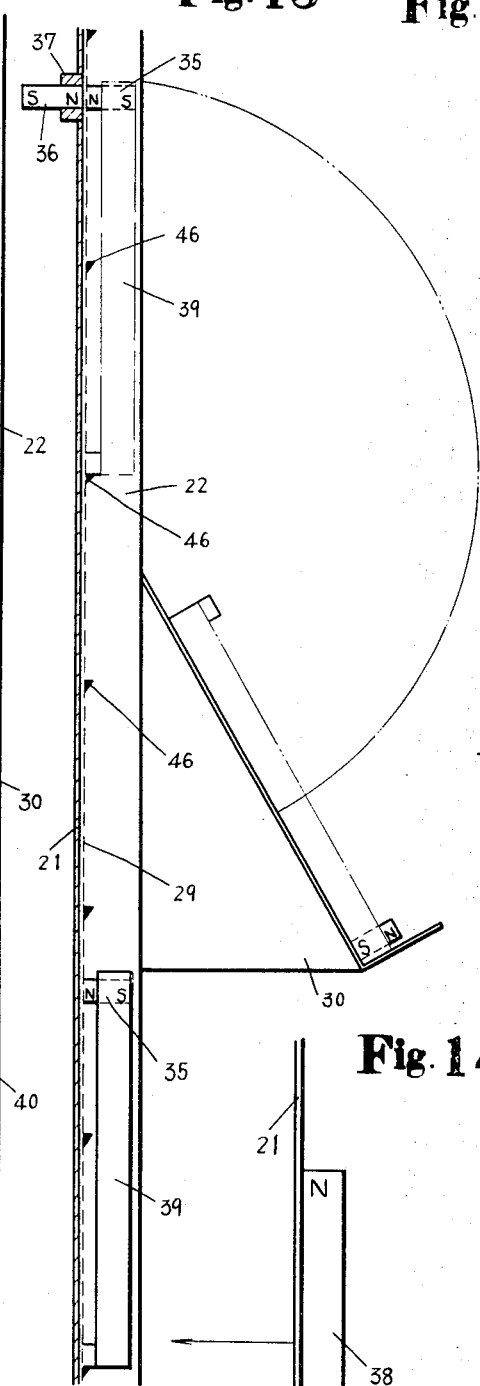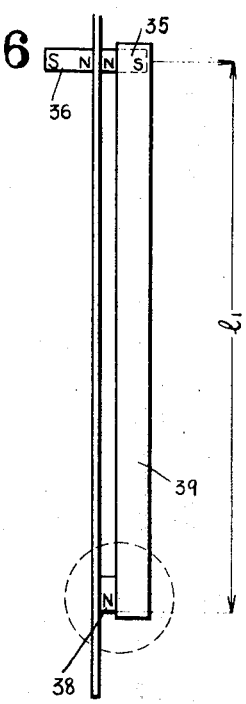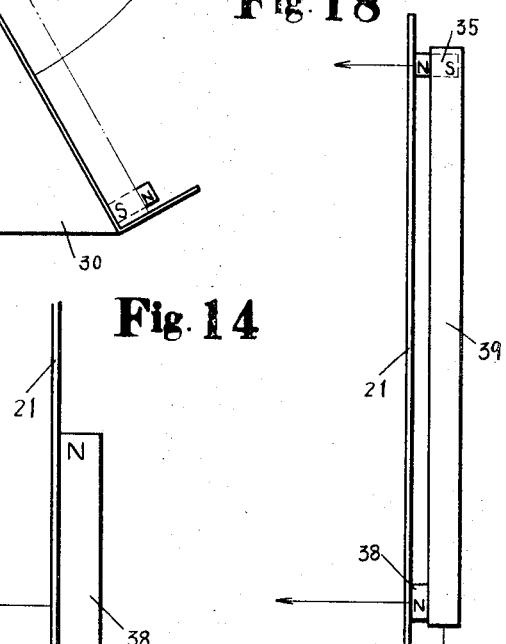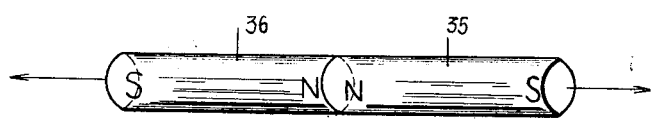

3,543,912

MAGNETIC CONVEYOR SYSTEM

BACKGROUND OF THE INVENTION

1. Field of the Invention

This invention pertains to conveyor devices for multistory buildings and the like. This invention is classifiable in Class 198, subclasses 41 and 232, Class 187, subclass 4 and Class 186, subclass 22.

2. Description of the Prior Art

Automatic conveyors for horizontal conveying of lightweight objects such as mail, documents and the like in a building are conventional, but such an equipment for conveying lightweight objects vertically is not conventional although such is required for multistory buildings. Heretofore, the bucket conveyor system, the trolley conveyor system, and the pneumatic conveyor system have been adopted for satisfying such requirements. However, these well known systems are too complicated and too expensive. Some of them are not provided with automatic means for selecting destinations. Others are not business machines.

SUMMARY OF THE INVENTION

The primary object of this invention is the provision of a conveyor system comprising a moving belt of a nonmagnetic material on and along an upwardly oriented structure made of a magnetically permeable material and placing a permanent magnet on a surface of the belt opposite to the structure, so as to be carried by the moving belt by virtue of the magnetic attraction between the magnet and the magnetically permeable material of the structure. The permanent magnet is adapted to hold the objects to be conveyed while being moved by the belt.

In accordance with the invention, the conveyor system has a flat elongated structure containing magnetically permeable material, a belt of a nonmagnetic material adapted to be moved on and along the structure while a surface of the belt is in contact with the structure, and a carrying box provided with a permanent magnet and adapted to be placed on the other surface of the belt and moved therewith by the action of the magnet.

The support structure is composed of several units so that it can be extended longitudinally by merely adding additional units. Some of these units are provided with means for supporting and driving the belt.

The support structure is provided with repulsing means fixedly positioned on the structure, whereby the conveying box is removed from the belt at a predetermined level. Such repulsing means may be spaced longitudinally and arranged at laterally distinct positions with respect to the structure, and permanent magnets may be arranged in different conveying boxes, at corresponding lateral positions, respectively, whereby the individual conveying boxes may be removed from the belt at different destination levels.

This invention makes it possible to convey lightweight objects, such as mail, documents, and the like vertically in a multistory building. Each conveying box may be delivered to any one among several destination levels of a building by a conveyor supported by a single line of structure. This conveyor means may be made rather inexpensively, installed in any building, and adapted easily to any conveying length.

BRIEF DESCRIPTION OF THE DRAWING

The invention will be better understood and other objects and additional advantages of the invention will become apparent upon perusal of the following description taken in connection with the accompanying drawings, in which:

FIG. 3 is an enlarged cross-sectional view of the structure of FIG. 2, taken along the line 3–3 in FIG. 2;

FIG. 4 is an enlarged view of an intermediate unit of the embodiment shown in FIG. 1;

FIG. 5 is an enlarged side view of a conveying box placed on the belt of the embodiment of FIG. 1;

FIG. 6 is an enlarged front view corresponding to FIG. 5;

FIG. 7 is a further enlarged perspective view of a different conveying box;

FIG. 8 is a front view of the conveying box of FIG. 7 when placed on the conveyor;

FIG. 9 is a side view of the details shown in FIG. 8;

FIG. 10 is a side view illustrating the destination selecting means and the destination station;

FIG. 11 is a side view of a modified conveying box, similar to the one shown in FIG. 9;

FIG. 12 is a front view of another embodiment of the invention;

FIG. 13 is a side view of the embodiment of FIG. 12;

FIG. 14 is a schematic in support of Experiment 1 of the disclosure;

FIG. 15 is a schematic in support of Experiment 2;

FIG. 16 is a schematic in support of Experiment 3;

FIG. 17 is a schematic in support of Experiment 4;

FIG. 18 is a schematic in support of Experiment 5.

DETAILED DESCRIPTION

Figure 1:
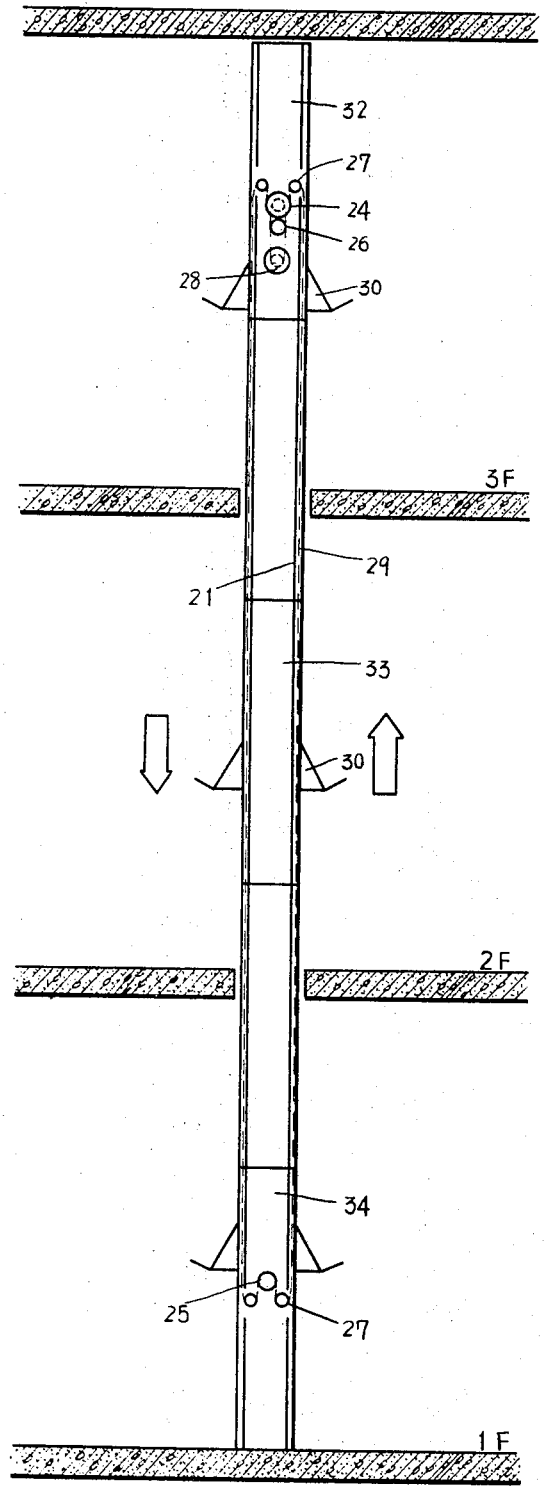
FIG. 1 is a schematic elevation of a conveyor system installed in a three-story building and embodying this invention.

This description will be understood to be illustrative of the invention and not as limiting to the particular arrangements shown and described. In FIG. 1 is shown a three-story building having a first floor 1F, a second floor 2F, and a third floor 3F. A shaft is provided through the second floor 2F and the third floor 3F for installing a conveyor means in accordance with this invention. Through this shaft is extended vertically a support structure for this conveyor means.

The support structure is composed of a plurality of structural units, a driving unit 32, intermediate units 33, and a belt support unit 34. This embodiment includes a driving unit 32 at the top of the support structure and a belt support unit 34 at the bottom thereof. There are three intermediate units 33 between the driving unit 32 and the belt support unit 34. They are linked together by connecting means 23.

Each structural unit is made of steel. It comprises two channels facing one another and held in place by two side members. The face plate 21 of the channel serves as a magnetically permeable counterpart for a permanent magnet in a conveying box which will be explained in more detail hereinafter. The flanges of the side members are arranged as guide flanges 22 for guiding a belt which moves on and along the face plate.

The driving unit 32 and the belt support unit 34 are provided with a driving roller 24, a tension roller 25, an auxiliary roller 26, and four guiding rollers 27. The driving roller 24 is driven by a small gear motor 28 intermediate a suitable transmission. These rollers and the motor are held in place by the side members.

Figure 2:
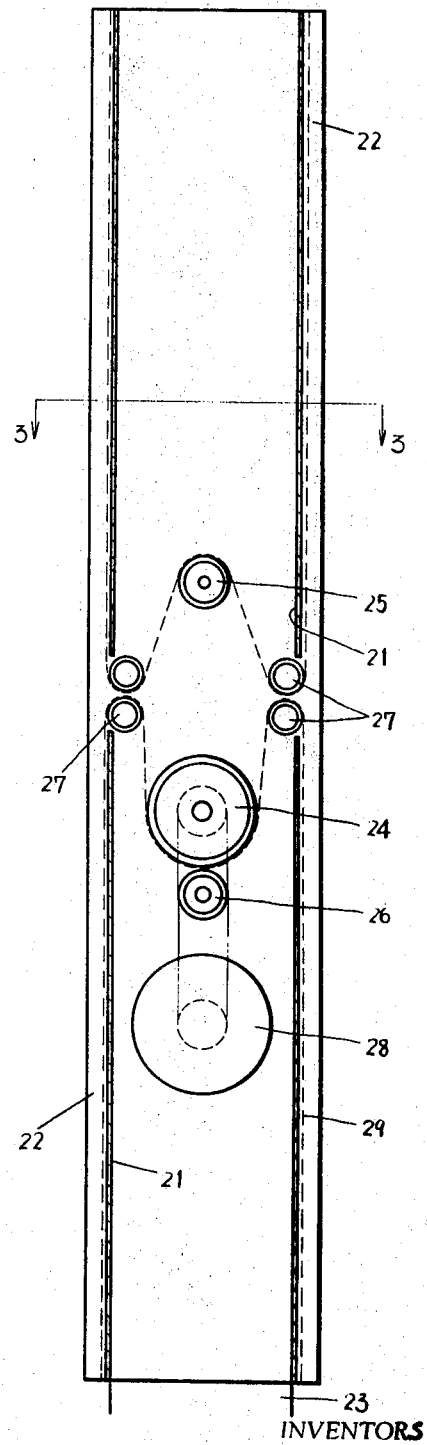
FIG. 2 is an enlarged view of the driving unit of the embodiment shown in FIG. 1.

The face plate 21 has an opening to allow arrangement of the two guiding rollers 27 at a tangential position to the outer surface of the face plate 21. A unit equipped in this manner is shown in FIG. 2 and it may be adapted as either a driving unit 32 or as a belt support unit 34. Without the driving roller 24 and the motor 28 as shown in FIG. 1, the unit may be used as a belt support unit 34. The intermediate unit 33 is not provided with these rollers and other belt driving means.

The belt 29 is an endless belt supported and driven by these rollers. The belt is pressed onto the driving roller 24 by the auxiliary roller 26 and extends over a guiding roller 27 of the driving unit 32, on the rear face plates 21 of the driving unit 32, of the intermediate units 33, and of the belt support unit 34, over a guiding roller 27 of the belt support unit 34, where the downward-moving belt turns upwards. The belt 29 passes further over the tension roller 25 and another guiding roller 27 of the belt support unit 34, on and along the front face plates 21 of the belt support unit 34, of the intermediate units 33, and of the driving unit 32. After passing over another guiding roller 27 of the driving unit 32, the belt 29 returns to the drive point between the driving roller 24 and the auxiliary roller 26. It can be seen that the endless belt 29 is moved upwards in front of the structure and downwards in the rear thereof so that the endless belt serves for carrying objects upwards in front of the conveyor means and at the same time downwards in the rear thereof. The belt 29 is made of nonmagnetic material which must be highly flexible and have a high coefficient of friction. In general, a certain fabric is suitable for the belt 29.

A permanent magnet may be moved with the belt 29 when such a magnet is placed on the belt during either the upward motion or the downward motion of it. In accordance with this invention, the permanent magnet 38 is mounted to a conveying box 39. The conveying box 39 is a flat box, of which the width is adapted for positioning between the two guiding flanges 22 of the units. To create magnetic attraction to the face plate 21 of the structural unit behind the belt 29, both poles of the magnet 38 may be used, so that the magnet 38 may be transversally as shown in FIG. 8. In either case it is necessary to arrange the magnets 38 on the rear surface of the conveying box 39 so that the magnets 38 are directly in contact with the front surface of the belt 29.

In operation, the motor 28 is energized so that the belt 29 is moved on and along the web plates 21 of the units upwards in front of the conveyor means and downwards in rear thereof. A conveying box 39 placed on the belt 29 in front of the conveyor in the first floor 1F is elevated with the belt 29 up to the second floor 2F and further to the third floor 3F. Another conveying box placed on the belt in the rear of the conveyor in the third floor 3F is lowered down to the second floor 2F and further to the first floor 1F. It is necessary to provide suitable means for holding objects to be conveyed in the conveying box 39 which is vertically placed on the belt 29. A lid 41 may be placed on the box 39 and kept in place by a rubber band 42.

The conveying box 39 is held to the belt 29 only by virtue of the magnetic attraction between the permanent magnet 38 and the face plate 21, so that it is preferred that the contacting surfaces of the belt 29 and the magnet 38 have high coefficients of friction. To this end, it is preferred to cover the contacting surface of the magnet 38 by a frictional piece 43 of a thin material having a high coefficient of friction, as shown in FIG. 11. Of course it is necessary to firmly attach the piece to the contact surface.

In accordance with this invention, it is possible to select a destination of the conveying box 39, that is to say, to automatically remove the conveying box 39 from the belt 29 so as to interrupt the vertical motion of the former. The conveying box 39 is provided with a series of destination selecting holes 44 near the top thereof. The series is arranged transversally and marked by numerals 40 as shown in FIG. 8. These numerals 40 represent the destination or the floor where the conveying box 39 is to be released. The destination selecting hole 44 is extended in the direction of the width of the box 39 and adapted for detachable insertion of a permanent magnet 35 serving as a destination selecting magnet. Cooperating with the destination selecting magnet 35, a repulsing magnet 36 is provided in each destination. The repulsing magnet 36 is secured to the rear of the face plate 21 by a securing means 37 as shown in FIGS. 7 and 8. The repulsing magnet 36 is positioned at the same transversal position as the destination selecting magnet 35, so that the latter is brought into alinement with the former when the former is moved with the belt 29. In order to repulse the destination selecting magnet 35 by the repulsing magnet 36, the two magnets are arranged to magnetically oppose each other. That is, if the S pole of the destination selecting magnet 35 is arranged in front of the conveying box 39, then the N pole of the repulsing magnet 36 is to be arranged also in front. The destination selecting magnet 35 serves for attracting the conveying box 39 to the face plate 21 until the conveying box arrives at the releasing position. When the conveying box 39 reaches the releasing position, the repulsing magnet 36 repulses the destination selecting magnet 35 so that the top part of the conveying box 39 is repulsed from the belt 29, while the bottom part of the conveying box 39 is still attracted to the face plate 21 by the magnetic action of the magnets 38 and moved upwards, thereby causing the conveying box 39 to be overturned. For receiving the overturned conveying box 39, there is provided a receiver 30 arranged over and across the belt 29 and held by the flanges 22. The repulsing magnets 36 may be electromagnets.

When the conveying box 39 is equipped with a destination selecting magnet 35, for example, in its "2" hole as shown in FIG. 7 and then placed on the belt 29 so as to be moved upwards, the destination selecting magnet 35 encounters a repulsing magnet 36 while passing through the second floor, where the conveying box 39 is separated from the belt 29 and overturned, to be received on the receiver 30 of the second floor 2F. Similarly, when the destination selecting magnet 35 has been inserted into the hole marked "3," the conveying box 39 is received by the receiver of the third floor 3F.

It is preferred to provide a bottom 44 for each hole for inserting the destination selecting magnet 35 as shown in FIG. 11. The bottom 44 is of a magnetically permeable material, such as steel sheet, so that the inserted destination selecting magnet 35 is attracted thereby. This way, the destination selecting magnet 35 is prevented from falling out of the hole when the conveying box 39 is moved.

FIGS. 12 and 13 illustrate another embodiment of this invention. This embodiment is somewhat simplified. In this embodiment, there is no permanent magnet 38 in the conveying box 39, and the magnetic force for attracting the conveying box 39 to the face plate 21 is created by the destination selecting magnet 35 only. The belt 29 is provided with a plurality of ledges 46 onto one of which the conveying box 39 is placed. The weight of a loaded conveying box 39 is supported by the ledge 45, while the destination selecting magnet 35 serves for attracting the top of the conveying box 39 to the face plate 21 until the box arrives at the releasing point. Because of this construction, this embodiment is not suitable for very long conveyors where several endless belts 29 are required in succession. It can be seen that, although it is possible to extend the framework at will, by adding additional intermediate units 33 one upon another, it is not practical to extend the endless belt 29 beyond a certain limit. Therefore, in the case of a conveyor longer than this limit, it is necessary to provide the conveyor means with a succession of endless belts 29 as illustrated in FIG. 2. In this embodiment, the conveying box 39 is provided with a permanent magnet 38 as well as with a destination selecting magnet 35, arranged at a different level, so that the conveying box 39 passes over the junction of the two endless belts 29.

In the following are described some experiments with respect to the operation of the invention. The following problems were investigated and the results of these experiments are listed below, in reference to FIGS. 14 through 18.

Experiment 1: The attracting force of the permanent magnet 38 to the face plate 21 was determined, as shown in FIG. 14, conditional on that,
 Dimension of magnet: length 110 mm., width 10 mm., height 7 mm.;
 Quality of magnet: Alnico-5 (JIS MCB-1 ); and
 Thickness of the belt: 0.1 mm. and the following were found:
 Residual magnetic flux density: 12,600 gauss;
 Attracting area of the magnet: 11 cm$^2$;
 Attracting force without intermediate matter: 1720 grams;
 Attracting force with intermediate 0.1 mm. thick fiber: 1250 grams.

Experiment 2: The repulsing force between the selecting magnet 35 and the repulsing magnet 36 was determined as shown in FIG. 15, conditional on that,
 Dimension of magnet: length 50 mm.; width 10 mm.; height 10 mm.; and
 Quality of magnet: Alnico-5 ; and the following were found:
 Residual magnetic flux density: 12,600 gauss;
 Attracting area of the magnet: 1 cm.$^2$;

Attracting force without intermediate matter: 430 grams;
Attracting force with intermediate 0.1 mm. thick fiber: 380 grams;
Repulsing force without intermediate matter: 580 grams; and
Repulsing force with intermediate 0.1 mm. thick fiber: 520 grams.

Experiment 3: The repulsing moment of the destination selecting magnet 35 with respect to the bottom edge of the box was determined, as shown in FIG. 16, conditional on that,
Repulsing force found as above: 520 grams; and
Arm $l_1 = 30$ cm; and found
Moment of repulsion: $520 \times 30 = 15{,}600$ gram. cm.

Experiment 4: The attracting moment of the magnet 38 with respect to the same fulcrum as above and acting in the opposite direction, was also determined, as shown in FIG. 17, conditional on that,
Attracting force of the magnet 38 as found in the first experiment: 1250 grams; and
Arm $l_2 = 0.8$ cm; and found
Moment in opposition to the above repulsing moment: $1250 \times 0.8 = 1000$ gram cm.

Thus, the repulsing moment of 15,600 grams cm. is greater than the attracting moment of 1,000 grams cm.

Therefore, when the repulsing magnet 36 repulses the destination selecting magnet 35, the conveying box 39 is overturned.

Experiment 5: The friction was also determined in reference to FIG. 18, conditional on that,
Attracting force of the destination selecting magnet 35 as shown in experiment 2: 380 grams;
Attracting force of the magnet 38 as shown in experiment 1: 1250 grams; and
Coefficient of static friction between the magnets and the belt: 0.45; and found
Friction: $(1250 + 380) \times 0.45 = 735$ grams.
If the weight of the conveying box 39 including the magnets is 300 grams, then: $735 - 300 = 435$ grams.
Therefore, it is possible to convey a load of 435 grams.
Moment in opposition to the above moment of repulsion: $1250 \times 0.8 = 1{,}000$ gram cm.
Thus, the moment of repulsion; 15,600 grams cm. 7 the moment in opposition 1,000 gram cm.
Therefore, when the repulsing magnet 36 repulses the destination selecting magnet 35, the conveying box 39 is overturned.

Expt. 5: The friction was also investigated, as shown in FIG. 18, conditional on that,
Attracting force of the destination selecting magnet 35 as shown in Expt. 2: 380 grams;
Attracting force of the radical magnet 38 as shown in Expt. 1: 1250 grams; and Coefficient of static friction between the magnets and the belt: 0.45; and found
Friction: $(1250 + 380) \times 0.45 = 735$ grams.
If the weight of the conveying box 39 including the magnets: 300 grams; $735 - 300 = 435$ grams.
Therefore, it is possible to convey a load of 435 grams.

We claim:
1. A conveying device for moving objects along an upwardly oriented path, comprising:
a support structure having a flat, elongated, and upwardly oriented slide face of magnetically permeable material representing a conveying path;
belt support means mounted on said support structure, an endless conveyor belt of nonmagnetic material rotatably mounted on said belt support means for movement along said upwardly oriented slide face with its inner surface in contact therewith;
means to drive said belt; and
a carrier means to be placed on the outer surface of said belt and capable of holding said objects, said carrier means comprising a carrier magnet having at least one flat surface for contacting said outer belt surface, said carrier magnet being capable of creating magnetic attraction forces between it and said slide face, so as to press against said belt surface, whereby when said belt is moved, it carries said carrier means along with it and a plurality of destination stations on said support structure to selectively receive said objects.

2. A device as claimed in claim 1, wherein said carrier magnet has a magnetic strength sufficient to create contact pressure and friction between it and said outer belt surface when placed in contact with said outer belt surface to overcome the pull of gravity on said carrier means and the object held by it.

3. A device as claimed in claim 2, wherein said flat surface of said carrier magnet in contact with said outer belt surface includes a friction layer to increase the frictional adherence between said carrier magnet and said outer belt surface.

4. A device as claimed in claim 1, wherein each of said destination stations includes a repulsing magnet having a magnetic polarity opposed in direction to the polarity of said carrier magnet, so that, when said carrier means reaches the level of said destination station and said carrier magnet passes over said repulsing magnet, magnetic repulsion forces are created therebetween which push said carrier means away from said belt.

5. A device as claimed in claim 1, wherein each of said destination stations includes a repulsion magnet located at a predetermined lateral position with respect to said slide face; said support structure further includes guide means to laterally determine the position of said carrier means with respect to said support structure and said slide face; said carrier means has a structure defining a plurality of laterally spaced destination markings, each destination marking being laterally alined with a repulsion magnet of a corresponding destination station when said carrier means is placed on the outer surface of said belt; said carrier means includes a destination selecting magnet having at least one flat surface for contacting said outer belt surface, and mounting means for detachably mounting said destination selecting magnet to said carrier means at any one of said destination markings, so that, when said destination selecting magnet is mounted at one particular destination marking of the carrier means and said carrier means is placed on said belt, in the lateral position determined by said guide means and with the destination magnet contacting said belt, and when said belt and carrier means move past the destination stations, said destination selecting magnet passes over the repulsing magnet of the corresponding destination station, thereby causing said carrier means to be repulsed from said belt.

6. A device as claimed in claim 5, wherein said destination markings are in the form of separate recesses defined by the structure of said carrier means and shaped to accommodate said destination selecting magnet.

7. A device as claimed in claim 5, wherein said mounting means are of a magnetically permeable material to magnetically retain said destination selecting magnet.

8. A device as claimed in claim 1, wherein said belt includes on its outer surface longitudinally spaced, narrow support ledges to support said carrier means on said belt, the extension of said support ledges above the belt being related to the distance between the belt and the common center of gravity of said carrier means and said objects held by it, so that when said carrier means is placed on said belt and is resting against one of said support ledges, the gravity force acting upon said carrier means will tilt it over said support ledge, when said carrier magnet is magnetically inoperative, and that said carrier means will remain on said support ledge and be moved with said belt, when said carrier magnet is magnetically operative.

9. A device as claimed in claim 1, wherein said belt includes a plurality of separate belt units arranged successively along said upwardly oriented path and moving in unison with one another, said slide face has an interruption where said belt units enter and exit said path, said interruption being sufficiently small in relation to said flat area of the carrier magnet contacting said belt that the reduction in the magnetic attraction forces caused by said interruption is not sufficient to release the carrier means from the belt.